United States Patent
Lutzker

(10) Patent No.: US 7,328,648 B2
(45) Date of Patent: Feb. 12, 2008

(54) APPARATUS FOR IMPROVING THE TASTE OF BEVERAGES

(76) Inventor: Robert S. Lutzker, 10 Woodstone Ct., So. Huntington, NY (US) 11746

( * ) Notice: Subject to any disclaimer, the term of this patent is extended or adjusted under 35 U.S.C. 154(b) by 197 days.

(21) Appl. No.: 10/123,876

(22) Filed: Apr. 16, 2002

(65) Prior Publication Data

US 2003/0003189 A1 Jan. 2, 2003

Related U.S. Application Data

(63) Continuation-in-part of application No. 09/835,861, filed on Apr. 16, 2001, now Pat. No. 7,100,495.

(51) Int. Cl.
*C12H 1/00* (2006.01)
*B01D 35/06* (2006.01)

(52) U.S. Cl. .......................... 99/277.1; 99/275; 210/22

(58) Field of Classification Search ................ 426/237, 426/592; 99/275, 277.1; 210/222
See application file for complete search history.

(56) References Cited

U.S. PATENT DOCUMENTS

| | | | | |
|---|---|---|---|---|
| 4,808,306 A | * | 2/1989 | Mitchell et al. | 210/222 |
| 5,113,751 A | * | 5/1992 | Holcomb et al. | 99/286 |
| 5,380,430 A | * | 1/1995 | Overton et al. | 210/222 |
| 6,287,614 B1 | * | 9/2001 | Peiffer | 426/237 |
| 6,390,319 B1 | * | 5/2002 | Yu | 220/230 |

* cited by examiner

*Primary Examiner*—Arthur L. Corbin
(74) *Attorney, Agent, or Firm*—Thomas A. O'Rourke; Bodner & O'Rourke, LLP

(57) ABSTRACT

The present invention is directed to a method and apparatus of treating wine to improve the wine's taste. This is accomplished by treating the wine with a magnetic field formed by one or more magnets, preferably at least two magnets. These magnets are positioned with one magnet at the base of a container that is holding the wine and another magnet at the top of the container.

20 Claims, 6 Drawing Sheets

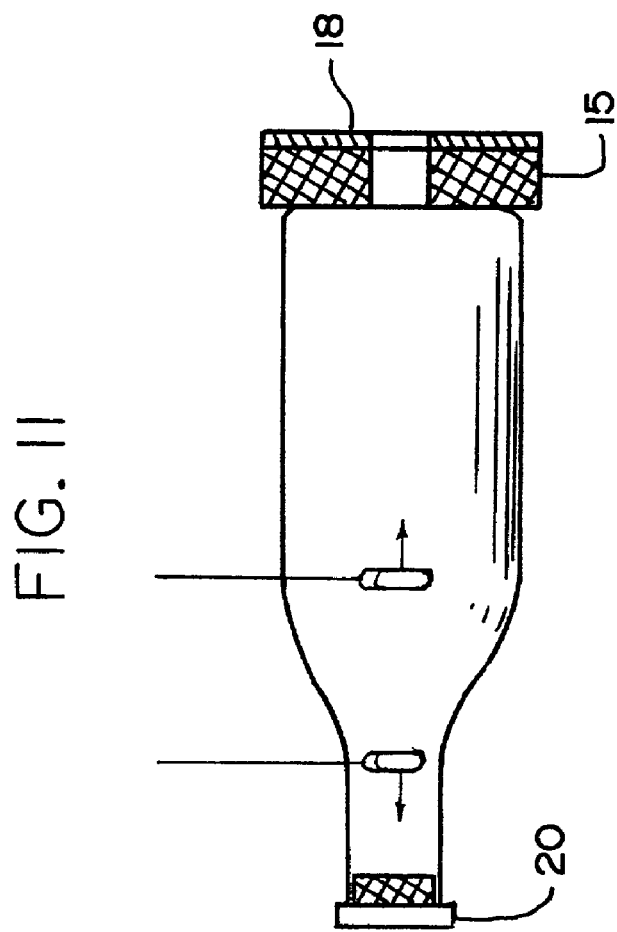
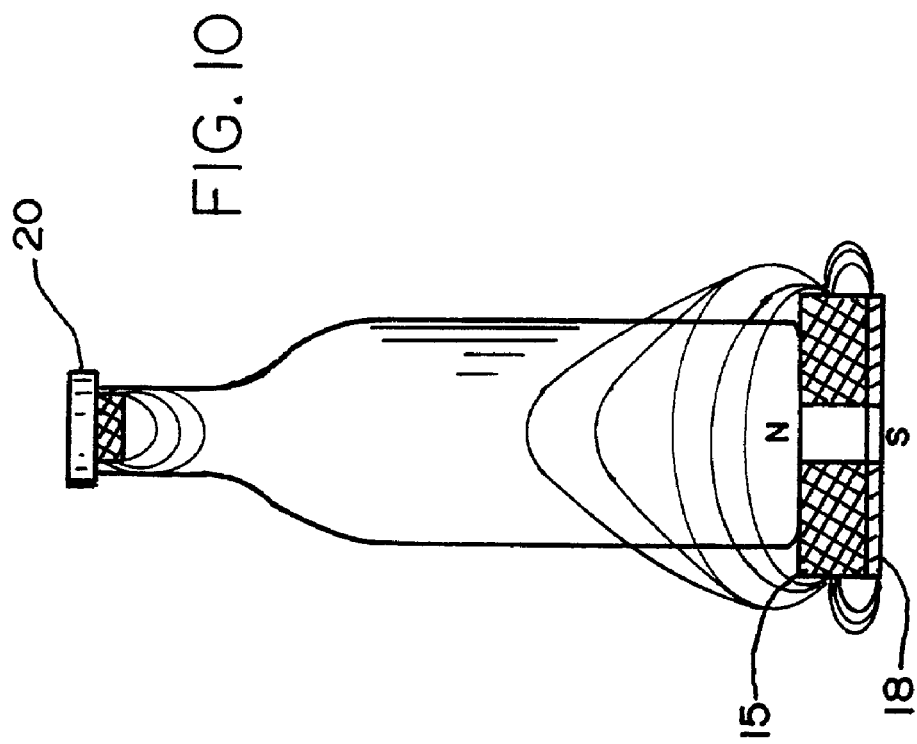

FIG. 12
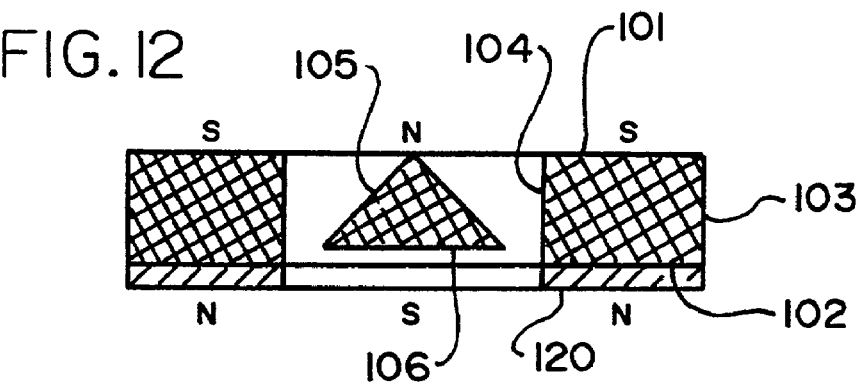
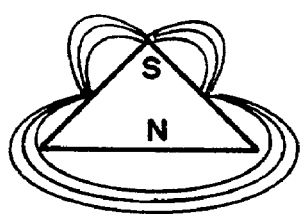
FIG. 13A
FIG. 13B
FIG. 15
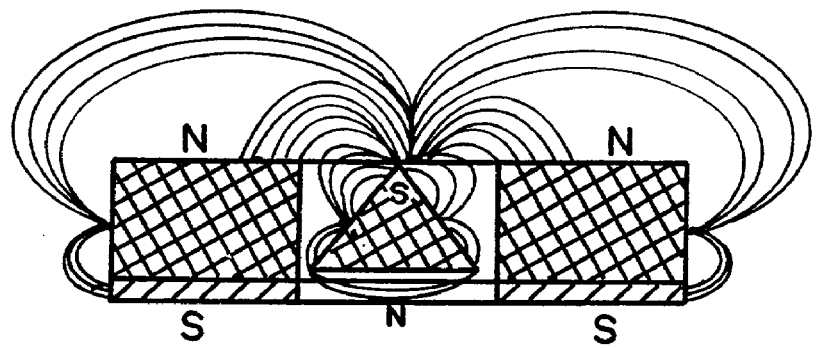
FIG. 16

APPARATUS FOR IMPROVING THE TASTE OF BEVERAGES

This application is a continuation in part of application Ser. No. 09/835,861 filed on Apr. 16, 2001 now U.S. Pat. No. 7,100.495, the disclosures of which are incorporated herein by reference.

FIELD OF THE INVENTION

The present invention relates to the field of beverages such as alcoholic beverages including beer and wines and other beverages such as coffee. In particular, the invention relates to improvements in the taste and enjoyment of certain beverages containing polar molecules including water, coffee and alcohol including wines. More particularly the present invention relates to apparatus and methods for eliminating some of the aggressiveness that some people perceive in the taste of some wines as well as creating a rounder, smoother tasting wine.

BACKGROUND OF THE INVENTION

Wine making is a complex blend of art, science and luck. Wine making is a very old process. For about 5,000 years man has used grapes to make wines by fermentation. Wine as used herein is defined as a liquid made by the partial or complete fermentation of the juice of grapes, and other fruits or berries. Grapes are the only fruit with a sufficiently high natural level of sugar and have the proper balance of acid and nutrients to sustain natural fermentation to dryness with stable results. Other fruits and berries may be fermented but usually require the addition of sugar, acid or various yeast nutrients to avoid spoiling.

Although there have been improvements in various aspects of the wine making process over the years, these improvements have been primarily in the equipment used in the processing of the grapes. The basic reaction by which grapes are transformed into wine remains unchanged. Typically, grapes are crushed to release the juice into a fermentation vessel. When the fermentation is complete the wine is pressed to separate the liquid from the stems, skin, pips and pulp. Wine is then stored to age and clarify.

Ripe grapes naturally have yeast cells residing on their surface that aid and abet the reaction of grapes into wine. When the yeast comes into contact with grape juice, the yeast begins to feed on the juice. The yeast contains an enzyme, zymase, that converts sugar in the grape juice to alcohol and carbon dioxide, as well as releasing heat. The reaction continues naturally until the sugar has been converted or the yeast dies off or weakens. The formula for the creation of wine is as follows

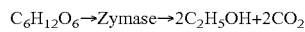

$$C_6H_{12}O_6 \rightarrow Zymase \rightarrow 2C_2H_5OH + 2CO_2$$

Fermentation will usually take about three weeks. During the first few days of the process frequently called aerobic fermentation, the reaction usually produces more yeast through reproduction of the yeast cells. This first step is followed by anaerobic fermentation which produces the most alcohol. Fermentation may be permitted to continue until there is no residual sugar or the reaction may be terminated at some point during the process to vary the level of sweetness. The reaction is usually terminated by killing or removing the yeast cells. This may be accomplished by adding alcohol to raise the level to 15% or more, adding sulfur dioxide or sorbate (sorbic acid), by filtering through a sterile filter or by chilling the must and filtering out the yeast cells.

The color of the wine comes from contact by the grape juice which is clear, with the skin of the grapes. The more color the skin has plus the amount of time the juice is in contact with the skin increases the color of the wine. Different steps in the making of the wine can cause variations in the taste and bouquet of the wine. for example, juice separated from the must before pressing usually has less bitterness and oxidation. This is called "free run." The leftover skins, pips and pulp is called the marc and usually has a lower fixed acidity but a higher volatile acidity as well as higher tannin than the free run. The speed and pressure of the press may also affect the wine. Too much pressure in the press may cause bitter tannins to leach from the seeds.

There is also a second fermentation that occurs in most wine making. This is called malolactic fermentation. In this type of fermentation, bacteria i.e., lactobacillus, converts some of the malic acid naturally present in grapes into lactic acid along with the resultant by product of carbon dioxide. Malolactic fermentation usually has the effect of softening the wine i.e., taking some of the edge off the wine.

Acids are a natural component of wine. However, if a wine is too low in acid the wine tastes too flat and dull. If the wine has too great an amount of acid the wine tastes too tart and sour. as a result, the wine maker frequently manipulates the acidity in the wine. The principal acids formed in grapes and therefore in wine are, tartaric acid, potassium hydrogen tartrate, malic acid and potassium hydrogen malate. The relative amounts of acid depend on the grape variety used to make the wine. In addition, the growing temperature of the grapes can also affect the amount of acidity in a wine. For example, the grapes grown in the Chablis region of France have a high acid content because the growing climate is relatively cool. On the other hand, the grapes grown in California's Napa Valley have a lower acidity because of the higher temperatures that these grapes grow at. Conversely, the higher the growing temperature, the higher the sugar content in the grape juice. Thus, the Napa Valley grapes have low acidity and higher sugar content than the Chablis grapes which are grown at a lower temperature.

Because of all the variations in the types of grapes, the region where the grapes are grown, the wine making process, the weather during a particular growing season and other factors there can be enormous variations in the taste of wines even made from the same type of grape. Some additional factors besides the foregoing that have a significant bearing on the quality of the final product include whether the barrels for the cellaring are made from French Oak, American Oak or some other material. Transport conditions and temperatures maintained during the distribution process are also important. For example, the length of time in transit in hot trucks can vary the quality of the wine compared to shipment in cooler conditions and for shorter periods of time. The length of time in a warehouse or on a retail shelf or exposure to U.V. light can introduce variations in the taste of a wine that are not always beneficial to the wine. In addition, because individual taste buds vary, the same wine may taste different to two different people. Thus a wine that tastes smooth to one person may taste sharper to another. In addition, some wine may be more bitter tasting than others.

OBJECTS OF THE INVENTION

It is an object of the invention to provide a method of improving the taste and/or bouquet of a wine.

It is another object of the present invention to provide an apparatus to improve the taste and/or bouquet of wine.

It is an object of the invention to provide a method of improving the enjoyment of a wine.

It is also an object of the invention to provide an apparatus for improving the enjoyment of a wine It is still a further object of the present invention to provide a wine that is demonstratively smoother and less sharp than a wine that has not be treated by the method of the present invention.

It is also an object of the present invention to provide an apparatus for treating wine to render it smoother and less sharp than a wine that has not be treated by the apparatus of the present invention.

It is another object of the invention to improve the taste of beverages compared to beverages that have been treated with a single magnet.

SUMMARY OF THE INVENTION

The present invention is directed to a method and apparatus of treating wine and other beverages to improve the beverage's taste, bouquet or nose. This is accomplished by treating the wine with a magnetic field formed by one or more magnets, preferably at least two magnets. These magnets are positioned with one magnet at the base of the container that is holding the wine and another magnet at the top of the container. In a preferred embodiment, the magnet at the top of the container is located in a top piece which may, if desired, act like a stopper that may be inserted into the orifice of the container. One or more plates that are preferably attracted to the magnet at the base are preferably present on the underside of the magnet. The presence of the plate is believed to create a stronger more directional magnetic force field. The plate further functions as a shunt that reduces or eliminates the magnetic field in the direction below the base.

The amount of time that the wine is treated by the magnetic field can vary. It has been found that even treatment for relatively short periods of time can significantly improve the taste of the wine. Although the reasons for he improvement in the taste of beverages is not completely understood, it is believed that the present invention creates a true magnetic field. The wine molecules are believed to imperceptibly follow the flux paths created by the dense magnetic field thus lengthening the tannin chain and aligning other components.

In a one embodiment of the invention, there are three magnets present. As discussed above, there is a magnet at the top of the container and two magnets at the base of the container. In this embodiment, one base magnet is a ring magnet having a top surface and a bottom surface that are generally flat and a side wall about the perimeter of the magnet that joins the top and bottom surfaces. There is also a center region that is open and is preferably in the form of a circular ring. Positioned in the center ring is a third magnet. In a preferred embodiment the third magnet may be a cone shaped magnet, although other shapes are possible. The cone shaped magnet has a base portion and an apex. The base portion is preferably in the same general plan as the bottom surface of the ring magnet. The cone shaped magnet has side walls extending from the base portion to the apex. In one embodiment, the base portion is generally circular and the side walls of the cone extending therefrom are generally straight giving the magnet the shape of an inverted cone. It has been found that this arrangement of the magnets provides improved taste in beverages, particularly beverages containing a polar molecule.

BRIEF DESCRIPTION OF THE DRAWINGS

FIG. 10 is a representation of what is believed to be the approximate flux path of the magnetic field to be when the stopper is placed in a bottle and the bottle was placed on the base of the present invention with a metal plate on the underside of the magnet.

FIG. 11 shows an example of the distance of attraction and the direction of force to the base and top magnet.

FIG. 12 is a side view of the base of an alternative embodiment of the present invention.

FIGS. 13A and 13B are respectively a top view and a side view of a preferred embodiment of the cone shaped third magnet shown in FIG. 12.

FIG. 15 shows the flux lines for a cone magnet of the type used in FIG. 14.

FIG. 16 shows the flux lines for a cone magnet of the type used in FIG. 14 where the cone magnet has been positioned in the open portion of the ring magnet.

DETAILED DESCRIPTION OF THE INVENTION

Figure 3:
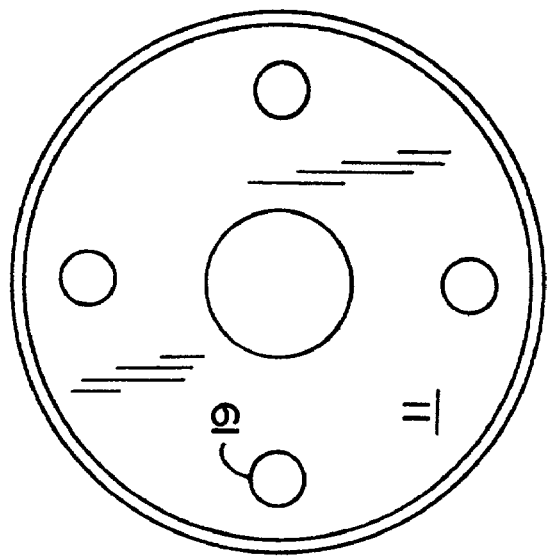
FIG. 3 is a bottom view of the stand of FIG. 1.
Figure 2:
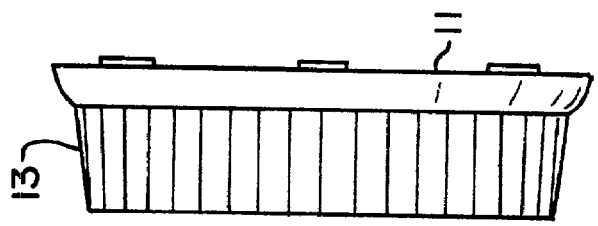
FIG. 2 is a side view of the stand of FIG. 1.
Figure 1:
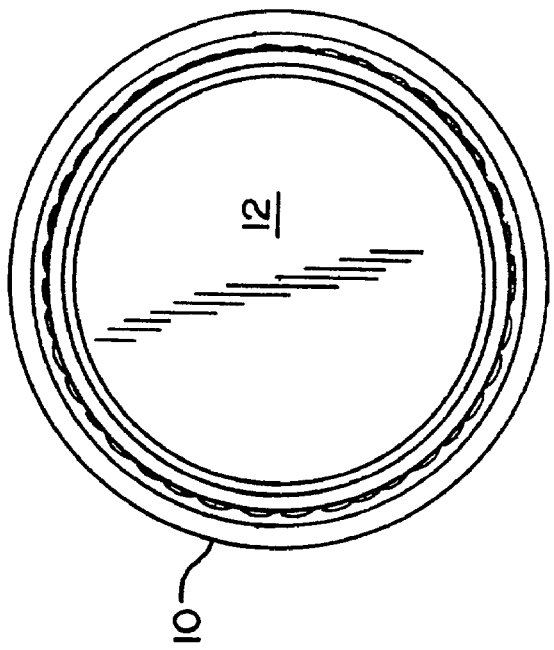
FIG. 1 is a top view of the stand containing a magnet for locating the base of the container of wine.

As shown in FIG. 1, there is a base 10 having a bottom surface 11, a top surface 12 and one or more side surfaces 13. In a preferred embodiment, the top surface is recessed at least slightly such that the side surface 113 extends above the plane of the top surface 12 to form a side wall 14, thus providing a more stable base and reducing the risk of spillage. The top surface of the base is separated from the bottom surface by a distance sufficient to permit a magnet 15 to be placed into the base. In an alternative embodiment the top surface of the base may be a surface of the magnet.

The base may have virtually any shape. In addition, the internal area formed by the side wall may also be any shape. It is preferred that the area formed by the side wall be the same as the shape of the container to be mounted on the base. For example, where the container of wine is a round bottle, the side wall is preferably, but not required to be, round to accommodate the shape of the bottle. In the event the container of wine is square or some other shape the side wall can be made to fit that shape also. The base can hold a bottle, a carafe, a glass of wine, a mug or any other type of container.

The base may be made out of any suitable material. It is preferred that the base be made of a material that does not inhibit a magnetic field extending from the top surface 12 of the base 10. Suitable materials for the construction of the base are plastics such as but not limited to polyproplyene, nylon, ABS or many other plastics. Other materials that may be used for the construction of the base are wood, glass, ceramic, or metals provided that the top surface 12 does not affect the magnetic field generated by the magnet. In addition, the top surface of the base should not have a density that shunts or weakens the magnetic force field below the level desired.

Figure 4:
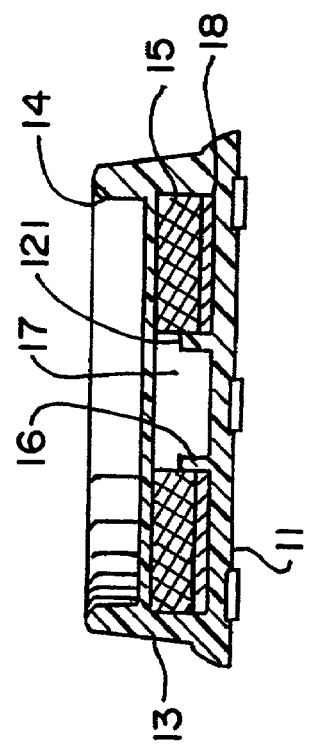
FIG. 4 is a cutaway view of the stand of FIG. 1 showing the arrangement of the magnet in the stand.

As seen in FIG. 4 the magnet 15 is preferably in the shape of a ring with a hollow center 17. The magnet ring is preferably held in place in the base by a guide 16 that prevents the magnet from moving around in the base, or the magnet is the size of the cavity in the base housing. It will be appreciated that the magnet may be any shape in the base. In addition, the magnet need not have an open center portion 17. It has been found, however, that a ring magnet as shown in FIG. 4 provides the most improvement in the taste of the wine. It is believed that this is due to the shape of the magnetic field generated by these types of magnets.

One or more plates 18 that are preferably attracted to the magnet at the base are preferably present on the underside of the magnet. The presence of the plate is believed to create a stronger more directional magnetic force field extending upwardly from the base toward the container of wine that is placed on the base. The plate further functions as a shunt that reduces or eliminates the magnetic field in the direction below the base. This is advantageous not only for improving the wine but also is beneficial because it reduces the risk that the underside of the base will be attracted to other metallic objects in the kitchen or other location where the base will be stored or used. In addition, the plate reduces the attraction of the base to other bases during shipping or warehousing the product. The plate is preferably a flat disk however, alternative configurations are possible including a cup like shape with a flat base and sides extending upwardly along the edge of the disk. In addition, the plate preferably has an opening in the center similar to the center opening in the magnet. The presence of the plate permit a weaker magnet to be used to achieve the same result as a thicker magnet without the plate. Another benefit is a reduction in the weight.

The bottom surface 11 of the base is preferably a separate member from the remainder of the base. This facilitates insertion of the magnet or the magnet and plate(s) during assembly. The base can be snap fit, sonic welded, glued or screwed into the underside of the base 10 in order to complete assembly. The bottom surface 11 is preferably provided with a plurality of bumpers 19, usually made of rubber or other similar material. The bumpers help provide the base with a non slip, stable surface to rest on. One of the problems that can be encountered on a humid day is that condensation or other moisture can be present on the surface on which the base is resting. In the absence of non slip bumpers, there is a risk that the base could slide over the surface.

Figure 5:
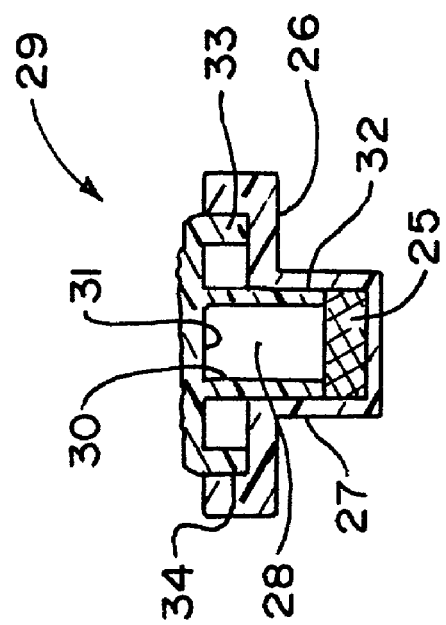
FIG. 5 is a top view of the stopper of the present invention.
Figure 7:
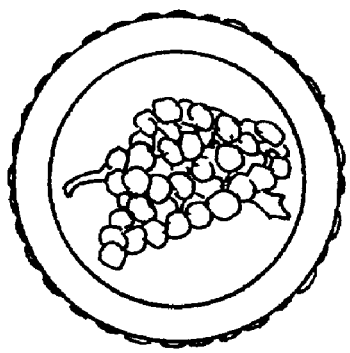
FIG. 7 is a cutaway view of the stopper of FIG. 5 showing the arrangement of the magnet in the stopper.
Figure 6:
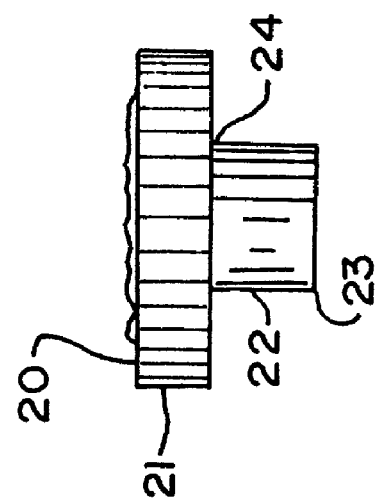
FIG. 6 is a side view of the stopper of FIG. 5.

In order to have optimum treatment of the wine by the magnetic field it is desirable that a second magnet be placed at the end of the container opposite the base. Because the top of most wine containers is very small, it is preferred that the magnet be placed in a stopper as shown in FIG. 7. The stopper 20 of FIG. 5 has a top member 21 and a plug member 22 extending therefrom. The plug member is shaped to be inserted into the orifice of the container. It is preferred that the plug be narrower in cross-section at the tip 23 than at the neck 24 for ease of insertion into the orifice in the container. The fit of the stopper in the container can be loose or a friction fit. Preferably, the top member 21 is larger in cross-section than the cross section of the container top where the stopper is inserted to permit the user to get a grip on the stopper to remove it from the container and to prevent it from falling into the container or bottle. The magnet in the stopper may be in the form of a disk or a ring.

FIG. 7 shows a cut away view of the stopper showing the preferred placement of the magnet in the stopper. The stopper 20 preferably has a body portion or sheath 26. The body portion has a exterior 27 and an interior 28 and is preferably open at its upper surface. The magnet 25 is preferably a disk that rests in the lower interior surface of the stopper. Plug 29 is inserted into the opening in the top of the stopper to hold the magnet in place. The plug 29 has at least one first member 30 that extends from the underside surface 31 of the plug to the magnet 25 to retain the magnet in position and prevent the magnet from moving about in the plug. The first member preferably forms friction fit with the lower interior wall surface 32 of the plug. There is preferably at least one second member 33 that extends from the underside surface 31 of the plug. The second member preferably forms a friction fit with the upper interior wall surface 34 of the plug. The exterior surface of the stopper may be provided with a suitable decoration as desired.

The magnet in the stopper and the base are preferably ceramic grade magnets. However, the magnets may be permanent magnets made of a flexible style, steel, or rare earth, such as neodymium, strontium and alnico, etc. Rare earth magnets are preferably comprised of Samarium cobalt, or neodymium. Preferably the magnets in the base have at least 600 to 1400 surface Gauss on the top of the magnet facing the bottom of the bottle, more preferably at least 800 to 1200 Gauss and most preferably at least 900 to 1100 Gauss. The stronger the magnetic force the shorter the amount of time the wine needs to be treated to achieve the improvements in the taste of the wine. For a magnet having an induction force of at least 700 milliGauss, the amount of time that the wine should be treated is about 15 to about 30 minutes although this amount can vary based of the taste of the user. The coercive force of the magnet (bHc) is preferably in the range of 1500 to 3000 Oersteds, more preferably in the range of 2000 to 2600 Oersteds and most preferably in the range of 2200 to 2400 Oersteds . The $Bh_{max}$ is in the range of 2.5 MGOe to 4.00 MGOe, more preferably in the range of 3.20 to 3.60 MGOe and most preferably in the range of 3.30 to 3.40 MGOe . The maximum temperature that the magnet should be stored or used at is preferably no greater than 400° C.

Other type of magnets that may be used are ferrite magnets which are usually ceramics made primarily from iron and boron with a small amount of strontium. By weight they are stronger than steel or Alnico magnets but not as strong as the rarer earth magnets. One drawback of the ferrite magnets is that they tend to be quite brittle and may break easily.

The magnets in the stopper and the base should have their fields aligned preferably such that the stopper has the south facing down and the base has the north facing up. alternatively. when the stopper has the north facing down, the base can have the south facing up. It has been found that the present invention provides the best overall effect on the wine and other alcohol containing beverages when the stopper and the base both have the south facing down and the north facing up. It is believed that when the south faces downwardly, the south pole of the magnet drives through the north pole forming a circle of magnetic force. However, the beneficial effect of the present invention on wine and other alcoholic beverages may also be achieved where there is no special alignment of the magnets in the stopper or the base. The preferred magnet in the base is a ring magnet with an open center. If the magnet is a disk magnet without the hole or orifice in the center, the turbulence caused by the magnetic field is primarily present at the sides of the magnet and not in the center where a ring magnet is used.

It is believed that the magnetic field that is generated by the magnets causes the certain molecules in the wine to flow from the bottom of the bottle to the top in a constant motion along the flux lines of the magnetic field between the bottom and the top of the magnet. The top magnet is believed to close the loop of the magnetic path between the bottom and top magnet. The ring magnet on the bottom of the bottle is particularly useful where the bottle has a punt at the base of the bottle.

Figure 8:
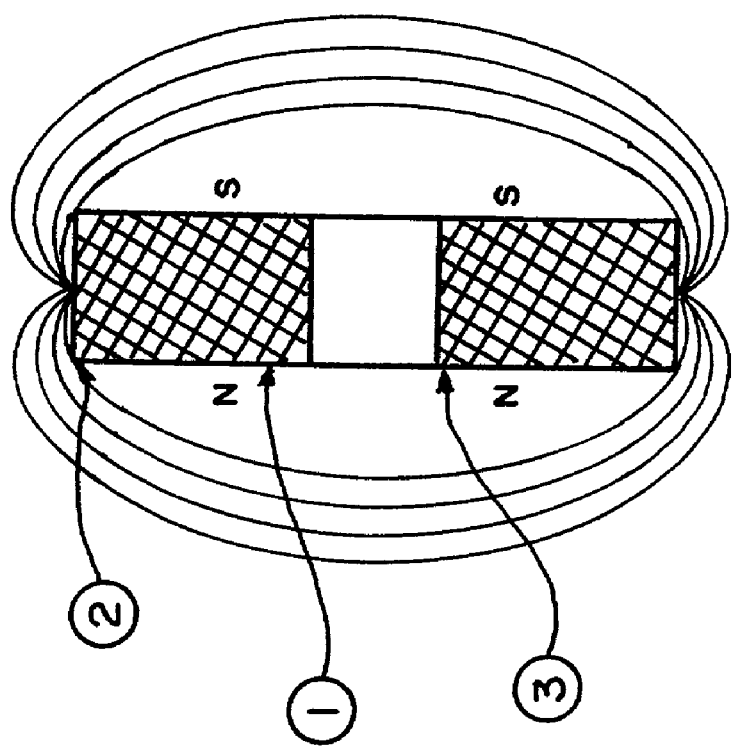
FIG. 8 is a representation of what the magnetic flux lines are believed to be for the base without a stopper present and without the metal plate present.

FIG. 8 is a representation of what the magnetic flux lines are believed to be for the base without a stopper present and without the metal plate present. In this instance, a reading with a Gaussmeter was taken at three points on the North side of the magnet and one on the South side. These reading are as follows

| Location | Gauss Reading |
|---|---|
| 1 | 530 |
| 2 | 750 |
| 3 | 950 |
| 4 | 680 |

Figure 9:
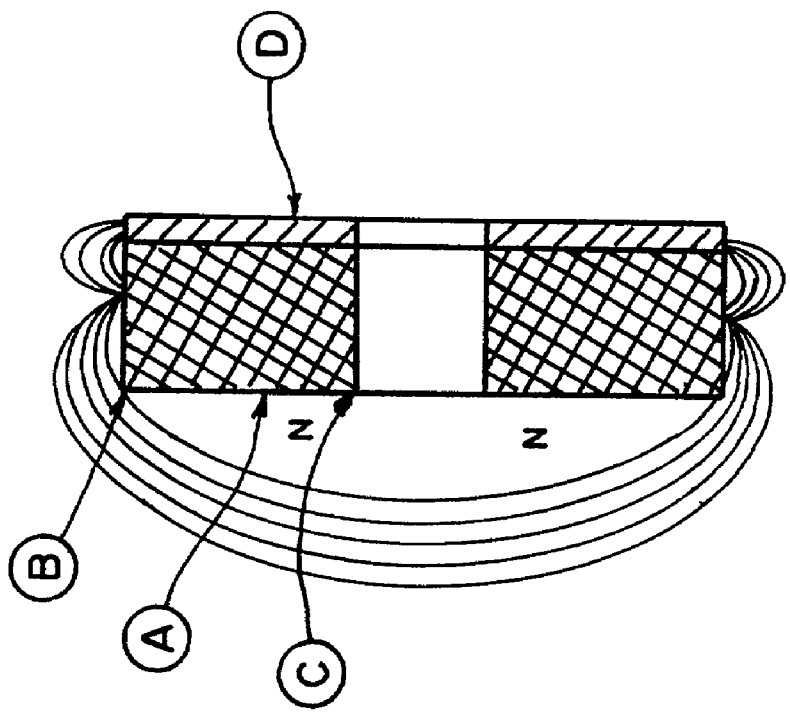
FIG. 9 is a representation of what the magnetic flux lines are believed to be for the base without a stopper present and with the metal plate present.

As seen in FIG. 9, the magnet was provided with a steel plate, in this case a metal washer, placed on the South facing side of the magnet of FIG. 8. The readings were taken at substantially the same locations as shown in FIG. 8 with the Gaussmeter. The reading obtained are as follows:

| Location | Gauss Reading |
|---|---|
| A | 730 |
| B | 1200 |
| C | 1170 |
| D | 360 |

As can be seen from the results of the measurements, the presence of the metal washer reduces the magnetic flux at the South side of the magnet and increases the flux at the North side of the magnet. As the thickness of the metal plate increases or if additional plates are added, the amount of leakage of the magnetic flux on the South side of the magnet is further reduced and the magnetic flux at the North side of the magnet increases. does appear to improve the efficiency of the magnet.

FIG. 10 shows what applicant believes the approximate flux path of the magnetic field to be when the stopper is placed in a bottle and the bottle was placed on the base of the present invention with a metal plate on the underside of the magnet. These flux lines are based on the data generated from the example of FIG. 11. FIG. 11 shows an example of the distance of attraction and the direction of force to the base and top magnet. These readings may vary depending on the type of magnet and the points of measurement. This example shows the arrangement of a first magnet at the base of a container and another magnet at the top of a container. The test was performed with top and base magnet laid out in horizontal position in the same form as a bottle would be in if it were in the vertical position using the present invention. The distance between the and the top magnet is 9 inches. A metal paper clip was suspended from a thread in the center line perpendicular to the base magnet. It was noted that for up to 6 inches from the base magnet the paper clip was attracted to the base magnet very easily and from 6.5 inches from the base magnet the clip started moving toward the top magnet. This indicates that a more than satisfactory flow of magnetic flux line is between the base and top magnet.

Gauss readings were performed of the magnetic flux on the center line with one base magnet and a second reading with top and base magnets. In the following table, C1 is the readings with a single base magnet and not stopper magnet being present. . C2 is a reading where there is both a base magnet and a stopper magnet at the same locations as in C1. O1 are the readings that would be on the outer diameter of the bottle with only the base magnet and no stopper magnet. O2 are the readings that would be on the outer diameter of the bottle with the base magnet and a stopper magnet present.

| Distance in inches from the base magnet | C1 | C2 | O1 | O2 |
|---|---|---|---|---|
| 1 inch | 270 | 247 | 145 | 135 |
| 2" | 134 | 138 | 75 | 67 |
| 3" | 70 | 68 | 45 | 37 |
| 4" | 36 | 38 | 28 | 24 |
| 5" | 22 | 24 | 17 | 16 |
| 6" | 15 | 19 | 11 | 9 |
| 7" | 11 | 57 | 8 | 6 |
| 8" | 8 | 84 | 6 | 4 |
| 9" | 6 | 740* | 4 | 2 |

The Gauss reading on the small magnet. The high number is due to the smaller diameter of the magnet thus having the flux lines more dense. The energy of the magnet remains the same. As can be seen from the Gauss reading numbers, the flow of molecules in the wine should be slow and gentle following the magnetic flux path, thus, it should produce a nicely enhanced and better aged wine.

One embodiment of the present invention has the top magnet and the bottom magnet as described above. The bottom magnet has a top surface 101 and a bottom surface 102. These are also one or more exterior side walls 103 joining the top and bottom surfaces. There are also one or more interior side walls 104 that form an opening in the bottom magnet. In a preferred embodiment, the bottom magnet is preferably a ring magnet having an exterior circumference that forms generally an outer circle and an inner circumference that forms an open area also in the form generally of a circle. While the preferred embodiment is a circular ring magnet it will be appreciated that other configurations are possible. As discussed above there may also be a washer 120 made of steel or other suitable material.

In this embodiment of the invention, there is a second magnet that is positioned in the open area of the bottom magnet. This second magnet may be a cone shaped member 105. The cone shaped magnet has a base 106 and apex 107. Extending from the apex to the base are one or more sidewalls 108. FIG. 13B shows the cone shaped magnet, with one or more sidewalls extending from an apex to a base and those sidewalls of the cone shaped magnet being separated a first distance from the sidewall of orifice of the first magnet at the apex and a second distance at the base, the first distance being greater than the second distance. This is shown in FIG. 12. In a preferred embodiment, the base of the cone is generally circular. However, the base 105 of the cone can be other shapes such as elliptical, square rectangular or other shapes. Preferably the shape of the base of the cone shaped magnet should be generally the same shape as the shape of the interior opening of the ring so that the ring fits into the opening. Preferably the base 106 of the cone is in the same plane as the bottom surface 102 of the bottom magnet. However, it is not required that the base of the cone be in the same place as the bottom surface of the bottom magnet. Similarly, the tip the cones may be in the same plane as the upper surface of the bottom magnet. Alternatively, the tip of the cone may be above or below the plane of the upper surface of the bottom magnet. In a preferred embodiment the bottom magnet is in the shape of a ring with an orifice in its center.

In order to position the cone shaped magnet within the bottom magnet there is preferably a separator wall 121 or ring that is inserted into the opening in the bottom magnet that positions the cone magnet so that the cone magnet is centered in the opening and the distance from the interior sidewall 104 of the ring magnet to the base 106 of the cone magnet is generally the same about the entire circumference of both the base 106 of the cone and the interior sidewall 104 of the of the bottom magnet. This separator ring may for example be a wall or ridge that extends upwardly from the upper surface of a stand for holding the ring magnet. As in the case of the bottom magnet without the cone shaped magnet, it is preferred but not required that the ring magnet be provided with a steel plate 120, in this case a metal washer, placed on the bottom surface of the bottom magnet.

Figure 14:
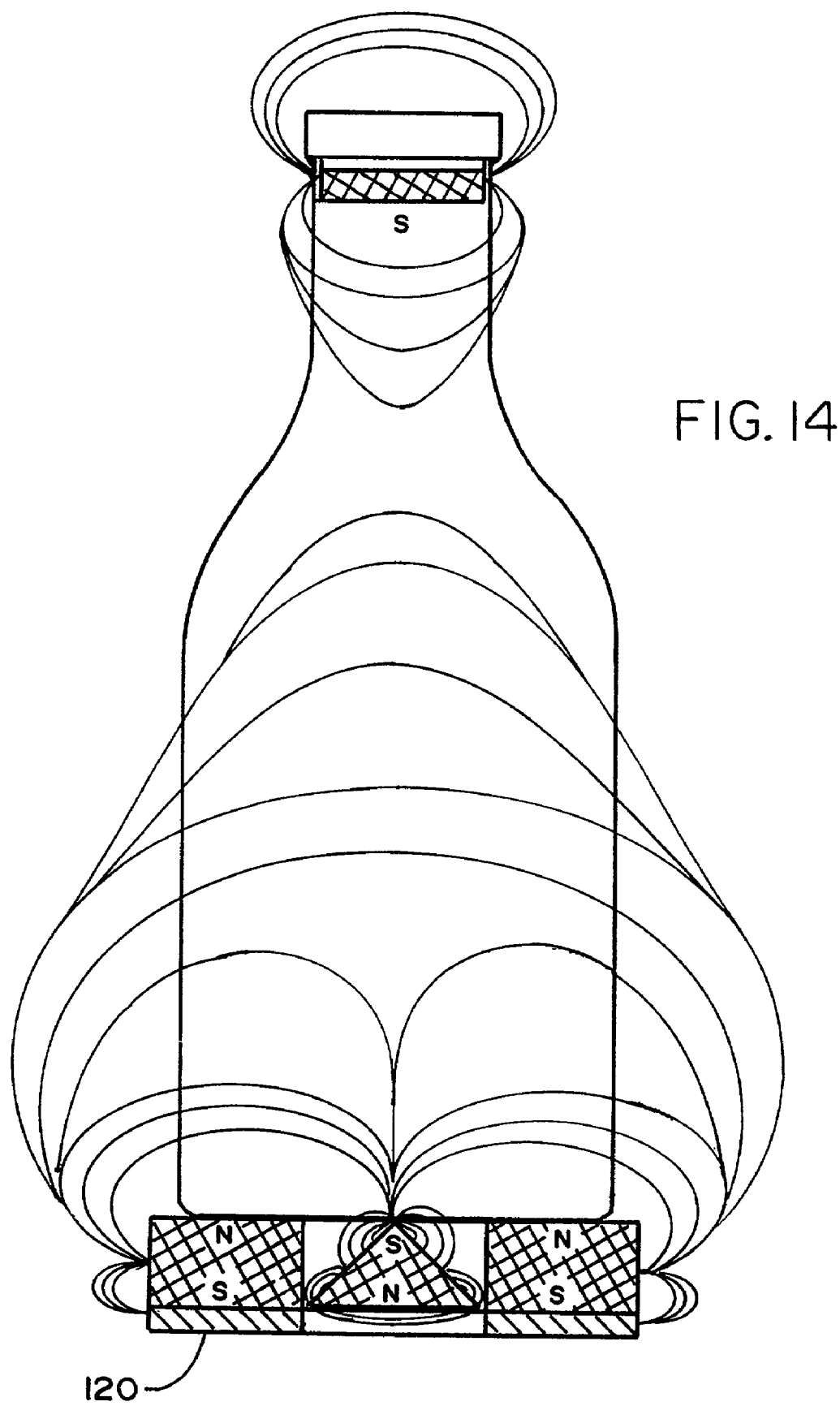
FIG. 14 is a side view of a bottle or other container containing a beverage where the base magnet has a cone magnet present.

FIG. 14 shows the flux lines of the magnetic field formed by the three magnets used in this embodiment of the present invention. In this Figure, the North side of a ring magnet is facing up and the South side of a ring magnet is facing downwardly away from the container of beverage. A metal washer 120 is placed in contact with the South side of the ring magnet to enhance the flux generated by the ring magnet.

The cone magnet 105 has its pole positioned opposite the polarity of the ring magnet. As seen in FIG. 14, The tip of the cone has the South polarity while the base of the cone has a North polarity. The magnet at the top of the bottle has its South pole facing downwardly while the North pole is away from the base of the container. The Figure shows a representation of the flux lines formed by this arrangement of the magnets. As can be seen from FIG. 14 the flux path formed by the ring and cone magnet in conjunction with the cap magnet creates a vertex in the center of the bottle.

FIG. 15 shows the flux path of the cone magnet by itself without the presence of other magnets distorting the flux field. FIG. 16 shows the flux field of the combination of the cone magnet and the cone magnet without the presence of the cap magnet. As can be seen from the flux paths of FIGS. 14 and 16, the presence of the cone magnet creates a center vertex in the flux path.

I claim:

1. An apparatus for treating a beverage containing a polar molecule, said apparatus having a base for supporting the bottom of a container when said container is placed thereon, said base comprising a first magnet that applies a magnetic force to the beverage, said first magnet having a first surface and a second surface, an inner sidewall and an outer sidewall, said first surface facing said container and said second surface being on the opposite side of the magnet from the first surface, said first surface having one polarity over its entire surface and said second surface a having second polarity over its entire surface, said first magnet being in the form of a ring, said ring having an orifice therein extending from said first surface to said second surface and formed by said inner sidewall of said first magnet, and wherein a second magnet is positioned within the orifice of said first magnet, said second magnet having a first surface and a second surface, said first surface of said second magnet facing said container, said second surface of said second magnet facing opposite said container, and wherein the polarity of the first surface of said second magnet is opposite the polarity of the first surface of said first magnet, said second magnet being in the shape of a cone, wherein the first surface of the second magnet is the apex of the cone, and the second surface of the second magnet is the base of the cone and wherein said first magnet has one or more sidewall surfaces around said orifice and said second magnet has one or more sidewalls extending from said apex to said base, one or more sidewall surfaces around said orifice of said first magnet surrounding said one or more sidewalls of said second magnet, said sidewall of said second magnet being separated a first distance from a sidewall of said orifice at said apex and a second distance at said base, said first distance being greater than said second distance and wherein said second surface of said first magnet has a metal plate magnetically attached thereto, said apparatus further comprising a stopper for said container, said stopper sealing said container when said stopper is placed in an opening at the top of said container, said stopper comprising a third magnet, said third magnet being adapted to be positioned in said opening of said container.

2. The apparatus according to claim 1 wherein the polarity of the surface of the first magnet facing said container is south and the polarity of the surface of said second magnet facing said container is north.

3. The apparatus according to claim 1 wherein the first magnet has said orifice in its center, said orifice passing from said first surface of the first magnet to the second surface of said first magnet.

4. The apparatus according to claim 1 further in combination with said third magnet and a beverage container, one end of said beverage container being placed on said base, said beverage container having a second end with an opening for removing said beverage, at least a portion of said third magnet being in said opening.

5. The apparatus according to claim 4 wherein the beverage contains an alcohol.

6. The apparatus according to claim 4 wherein the beverage is coffee.

7. The apparatus according to claim 5 wherein the beverage is wine.

8. The apparatus according to claim 4 wherein said base comprises a top member, a bottom member and a side wall connecting the top and bottom members, said second magnet being between said top member and said bottom member.

9. The apparatus according to claim 4 wherein said stopper comprises a top member and a plug member extending therefrom, said plug member being shaped to be inserted into the orifice of the container.

10. The apparatus according to claim 9 wherein the stopper has a top member having a top surface and a bottom surface and a neck extending therefrom said bottom surface, said neck being narrower in cross-section than said top surface.

11. The apparatus according to claim 10 wherein the top member is larger in cross-section than the cross section of the container.

12. The apparatus according to claim 10 wherein a magnet in the shape of a disk is in said plug member.

13. The apparatus according to claim 4 wherein said first magnet has 600 to 1400 surface Gauss.

14. The apparatus according to claim 4 wherein said first magnet has 800 to 1200 surface Gauss.

15. The apparatus according to claim 4 wherein said first magnet has 900 to 1100 surface Gauss.

16. The apparatus according to claim 1 wherein said magnet in said base has its south pole facing downwardly away from the container.

17. The apparatus according to claim 1 wherein the polarity of a side of the first magnet adjacent to the bottom of said container is south and the polarity of second magnet adjacent to said container is north.

18. The apparatus according to claim 1 wherein at least one of said magnets has 600 to 1400 surface Gauss.

19. The apparatus according to claim 1 wherein at least one of said magnets has 800 to 1200 surface Gauss.

20. The apparatus according to claim 1 wherein at least one magnet has 900 to 1100 surface Gauss. magnet has 600 to 1400 surface Gauss.

* * * * *